United States Patent
Schindler

(10) Patent No.: US 9,898,787 B2
(45) Date of Patent: Feb. 20, 2018

(54) ALLOCATION OF ENERGY PRODUCTION CHANGES TO MEET DEMAND CHANGES

(71) Applicant: Honeywell International Inc., Morristown, NJ (US)

(72) Inventor: Zdenek Schindler, Prague (CZ)

(73) Assignee: Honeywell International Inc., Morris Plains, NJ (US)

( * ) Notice: Subject to any disclaimer, the term of this patent is extended or adjusted under 35 U.S.C. 154(b) by 528 days.

(21) Appl. No.: 14/515,706

(22) Filed: Oct. 16, 2014

(65) Prior Publication Data

US 2016/0109895 A1 Apr. 21, 2016

(51) Int. Cl.
| | |
|---|---|
| G06Q 50/06 | (2012.01) |
| G05F 1/66 | (2006.01) |
| G05B 13/04 | (2006.01) |
| G06Q 10/06 | (2012.01) |

(52) U.S. Cl.
CPC ........... *G06Q 50/06* (2013.01); *G05B 13/048* (2013.01); *G05F 1/66* (2013.01); *G06Q 10/06* (2013.01)

(58) Field of Classification Search
CPC ...... G06Q 10/06; G06Q 50/06; G05B 13/048; G05B 13/02; G05B 15/02; G05F 1/66; Y04S 10/54; Y04S 20/222; Y04S 20/224; Y02B 70/3225
See application file for complete search history.

(56) References Cited

U.S. PATENT DOCUMENTS

| | | | |
|---|---|---|---|
| 5,278,772 A | 1/1994 | Knupp | |
| 7,209,838 B1 * | 4/2007 | Wright | ............... G01R 19/2513 |
| | | | 700/291 |
| 7,373,222 B1 * | 5/2008 | Wright | ...................... H02J 3/14 |
| | | | 700/20 |
| 7,826,908 B2 | 11/2010 | Cheng et al. | |
| 7,894,943 B2 | 2/2011 | Sloup | |

(Continued)

FOREIGN PATENT DOCUMENTS

| | | |
|---|---|---|
| EP | 2312506 A1 | 4/2011 |
| JP | 2013192386 A * | 9/2013 |
| WO | WO-2013/105087 A1 | 7/2013 |

OTHER PUBLICATIONS

"European Application Serial No. 15189034.0, Extended European Search Report dated Jun. 20, 2016", 16 pgs.

(Continued)

*Primary Examiner* — Crystal J Barnes-Bullock
(74) *Attorney, Agent, or Firm* — Schwegman Lundberg & Woessner, P.A.

(57) ABSTRACT

A computer implemented method optimizes a utility plant having multiple devices to convert input energy into output energy for a building. The method includes dividing a utility plant scheduling interval into several control intervals and for each control interval, obtaining a difference between a desired and a measured in-building condition controlled by output power from the utility plant, obtaining current values of multiple factors that influence operation of the utility plant, determining a new power demand of the building expected to decrease the difference, and finding set points for the multiple devices that satisfy the new power demand, take into account response times of the devices and their capacities, and optimize utility plant operation costs.

14 Claims, 11 Drawing Sheets

(56) References Cited

U.S. PATENT DOCUMENTS

| | | | |
|---|---|---|---|
| 7,966,104 B2* | 6/2011 | Srivastava | G05B 13/044 |
| | | | 700/299 |
| 8,269,622 B2* | 9/2012 | Chan | G01D 4/004 |
| | | | 340/12.32 |
| 8,417,391 B1 | 4/2013 | Rombouts et al. | |
| 9,335,748 B2* | 5/2016 | Francino | G05B 15/02 |
| 2004/0039490 A1 | 2/2004 | Kojima et al. | |
| 2009/0005912 A1 | 1/2009 | Srivastava et al. | |
| 2011/0125337 A1* | 5/2011 | Zavadsky | G06F 1/263 |
| | | | 700/291 |
| 2012/0010757 A1 | 1/2012 | Francino et al. | |
| 2012/0041610 A1 | 2/2012 | Varigonda et al. | |
| 2013/0110298 A1 | 5/2013 | Beveridge | |
| 2013/0144451 A1* | 6/2013 | Kumar | G05B 13/02 |
| | | | 700/291 |
| 2013/0221918 A1* | 8/2013 | Hill | H02J 7/34 |
| | | | 320/109 |
| 2013/0338835 A1 | 12/2013 | Pepe | |
| 2015/0094968 A1* | 4/2015 | Jia | G06Q 40/04 |
| | | | 702/60 |

OTHER PUBLICATIONS

"European Application Serial No. 15189034.0, Response filed Jan. 12, 2017 to Extended European Search Report dated Jun. 20, 2016", 14 pgs.

* cited by examiner

500

510 — $\sum_{k=0}^{K} C_k(t) \to min$, $k$ — index of energy flow from public grid in $t$ — th control interval 515 — $C_k(t) = c_{pk}(t) \cdot max(0; E_k(t)) + c_{sk}(t) \cdot min(0; E_k(t))$, $k = 1, 2, ..., K$ 520 — $E_k(t) = P_k(t) \cdot \Delta T$ 525 — $E_{kmin}(t) \leq E_k(t) \leq K_{kmax}(t)$ 530 — $P_k(t) = f_k(t, P_1(t), P_2(t), ..., P_J(t))$ 535 — $\Delta D(t)$ 540 — $D_R(t) = D_F + \Delta D(t)$ 545 — $P_{jmin} \leq P_j(t) \leq P_{jmax}$   $j \in M_t$, $P_j(t) = 0$ $j \notin M_t$ 550 — $\Delta P_{jmin} \Delta T \leq P_j(t) - P_j(t-1) \leq \Delta P_{jmax} \Delta T$   $j \in M_t$

610 — $\sum_{k=0}^{K} C_k(t) + w \cdot (D_{Rvar}(t) - (D_F + \Delta D(t))) \to min$, 615 — $C_k(t) = c_{pk}(t) \cdot max(0; E_k(t)) + c_{sk}(t) \cdot min(0; E_k)$, $k = 1, 2, ..., K$ 620 — $E_k(t) = P_k(t) \cdot \Delta T$ 625 — $E_{kmin}(t) \leq E_k(t) \leq K_{kmax}(t)$ 630 — $P_k(t) = f(t, P_1(t), P_2(t), ..., P_J(t))$ 635 — $\Delta D(t)$ 640 — $D_{Rvar}(t)$ 645 — $P_{jmin} \leq P_j(t) \leq P_{jmax}$   $j \in M_t$, $P_j(t) = 0$ $j \notin M_t$ 650 — $\Delta P_{jmin} \Delta T \leq P_j(t) - P_j(t-1) \leq \Delta P_{jmax} \Delta T$   $j \in M_t$

| CONTROL INTERVAL | REQUIRED DEMAND INCREASE | TOTAL DEMAND $D_R$ | SMALLER FAST BOILER 1 | BIGGER SLOW BOILER 2 | OPERATION COSTS |
|---|---|---|---|---|---|
| 1 | 0 | 100 | 30 | 70 | 1153 |
| 2 | 0 | 100 | 30 | 70 | 1153 |
| 3 | 20 | 120 | 40 | 72 | 1300 |
| 4 | 13 | 125 | 50 | 74 | 1447 |
| 5 | -3 | 121 | 45 | 76 | 1407 |
| 6 | -1 | 120 | 42 | 78 | 1392 |
| 7 | 0 | 120 | 40 | 80 | 1389 |
| 8 | 0 | 120 | 38 | 82 | 1386 |
| 9 | 0 | 120 | 36 | 84 | 1383 |
| 10 | 0 | 120 | 34 | 86 | 1381 |
| 11 | 0 | 120 | 32 | 88 | 1378 |
| 12 | 0 | 120 | 30 | 90 | 1375 |
| 13 | 0 | 120 | 30 | 90 | 1375 |
| 14 | 0 | 120 | 30 | 90 | 1375 |

*FIG. 8*

ALLOCATION OF ENERGY PRODUCTION CHANGES TO MEET DEMAND CHANGES

BACKGROUND

Energy of building complexes is often supplied by local utility plant, which converts energy from public resources to utilities needed in the building complex. Economically optimal scheduling of such a utility plant or a microgrid (from now on 'controlled plants') operation with complex internal structure consists in determination of set points of plant energy conversion devices, so that energy demands of the building complex are satisfied and plant operating costs are minimal. The solution is usually applied in fixed intervals usually 15 minutes to 60 minutes long, where the energy demands and the conversion characteristics are considered fixed.

In reality energy demand varies within these periods and there has to be a lower level controller that strives to balance energy supply and demand and ensures satisfactory operation of the whole system. The balances are of two types—hard balance that must be always satisfied (e.g. electricity supply and demand) and soft balance, which may be temporarily violated, such as heat delivery to building heating system may be less than needed for some time. The utility plant structures may be complex, and therefore, allocation of required production changes to cover demand changes can be complex.

Currently a fixed sequence of switching on and off energy producing devices is used to reach the balance when the demand significantly changes. For example, a first boiler in a set of boilers is first set to reach balance. If the first boiler in the set reaches its maximum allowed heat output and balance is not reached. a next boiler is switched on and changed, followed by the next in the list, until balance is finally reached.

SUMMARY

A computer implemented method economically optimizes operation of a utility plant having multiple devices to convert input energy to output energy for heating and cooling a building. The method includes dividing a utility plant scheduling interval into several control intervals. For each control interval, the method obtains a difference between a desired and a measured in-building condition controlled by output power from the utility plant, obtains current values of multiple factors that influence optimal operation of the utility plant, determines a new power demand of the building expected to decrease the difference, and finds set points for the multiple devices that satisfy the new power demand and take into account response times of the devices and their capacities.

A method of controlling a utility plant having multiple devices which consume power and provide energy includes receiving a forecast of building energy demand, receiving a forecast of factors influencing the operation of the utility plant, operating an optimizer in a scheduling mode to determine which devices should be on and to provide control actions to specify a set point for each running device so that the operation is economically optimal and no constraint is violated, and operating the optimizer in a control mode to distribute energy demand between the devices based on efficiency and response times of the devices to minimize purchased energy cost.

A device includes a processor, an input connections to receive energy demand and influencing condition information, and a memory device coupled to the processor and having a program stored thereon for execution by the processor. The processor executes the program to perform utility plant optimization by dividing a utility plant scheduling interval into several control intervals. The processor performs a method for each control interval including obtaining a difference between a desired and a measured in-building condition controlled by output power from the utility plant, obtaining current values of multiple factors that influence optimal operation of the utility plant, determining a new power demand of the building expected to decrease the difference, and finding set points for the multiple devices that satisfy the new power demand and take into account response times of the devices and their capacities.

BRIEF DESCRIPTION OF THE DRAWINGS

FIG. 5 is an illustration of an optimizer problem formulation in mathematical equation form according to an example embodiment.

FIG. 6 is an illustration of a relaxed optimizer problem formulation in mathematical equation form according to an example embodiment.

FIG. 8 is a chart illustrating demand and boiler output with operating costs in accordance with the example of FIG. 7.

DETAILED DESCRIPTION

Figure 1A:
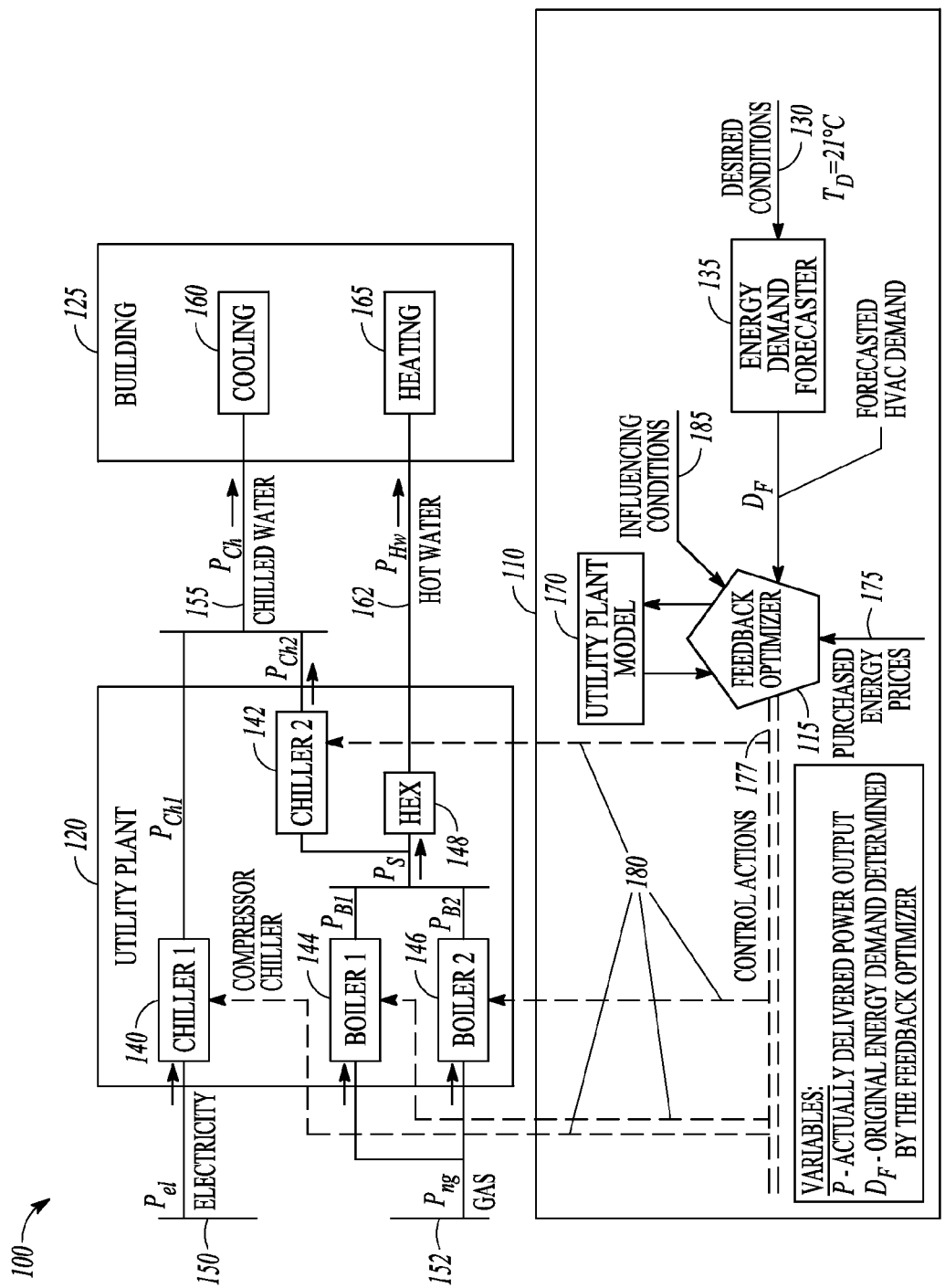
FIG. 1A is a block diagram illustrating a simple example of a controlled utility plant schema with an optimizing controller shown as operating in a scheduling mode according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media or computer readable storage device such as one or more memory or other type of hardware based storage devices, either local or networked. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Supervisory control of utility production in a controlled plant is usually done by an operator, potentially with the help of an optimizer. The operator determines the plant operation schedule-technology configurations and optimal set points of each device of the plant in elementary scheduling periods some time ahead. This high level scheduling may also be done automatically or semi-automatically with an operator in the loop.

During the scheduling interval, variations of various factors influence energy demand of the consumer. Some of these factors may include building occupancy, activity in the building complex, internal heat gains, weather conditions different from predicted (cloud cover, outdoor temperature), different indoor temperature set point and others. Deviations from values expected in the schedule have to be eliminated by actions managed by a lower level control system. Energy delivery has to be continuously changed to cover varying energy demands. The actions are targeted at conversion devices in accordance with predefined rules. For example, in one control strategy, a variation of heat demand is balanced by a specified gas boiler capable to balance the variations—a boiler fast enough, with satisfactory efficiency and currently sufficient heat production capacity. Other boilers are operated with a constant output. When one boiler is not capable to keep the balance another one is employed.

Another control strategy for sequencing may utilize a single, lead boiler, with other networked boilers referred to as slaves. When demand is increasing, the lead boiler is the first to start and the slave boilers are started in sequential order (1, 2, 3, . . . ) until the demand is satisfied. When demand is decreasing, the boilers are stopped in reverse order which helps equalize run time hours on all boilers. Smaller variations, such as boiler modulation, are not considered These strategies do not exploit the potential of current control technology and may be insufficient in case of modern plants with highly interlinked devices.

Figure 1B:
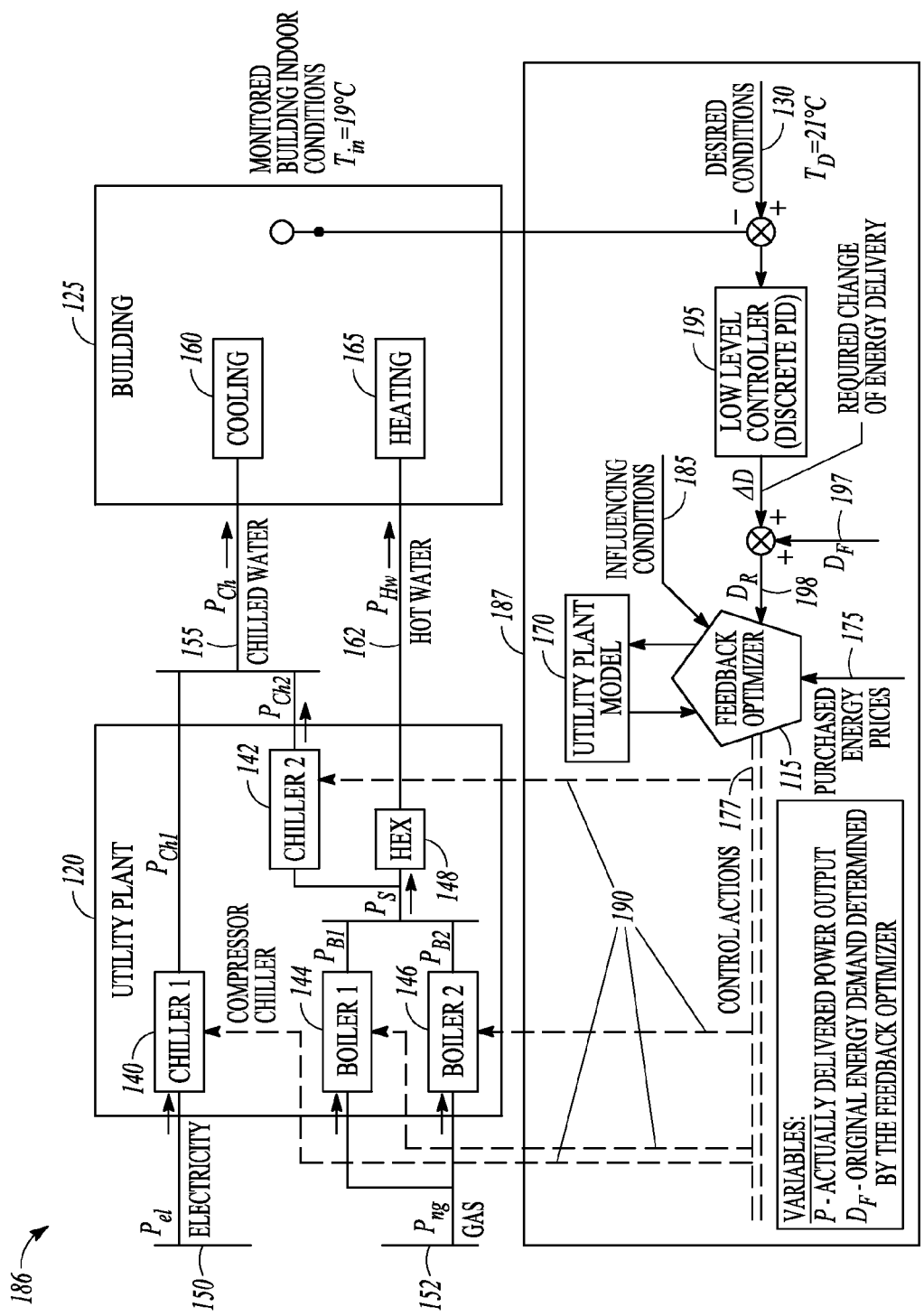
FIG. 1B is a block diagram illustrating a simple example of a controlled utility plant schema with an optimizing controller shown as operating in a feedback mode according to an example embodiment.

FIG. 1A is a block diagram illustrating a simple example of a controlled utility plant schema generally at 100 with an optimizing controller 110 shown as operating in a scheduling mode to provide a schedule describing on and off states of various energy producing devices in the utility plant. In the scheduling mode, the optimizing controller 110 operates in a feed forward mode, not in a feedback mode. In various embodiments, a feedback optimizer 115 operates as a nonlinear controller performing optimal resource allocation using a nonlinear model of energy conversions in a controlled plant 120. In a feedback mode, the feedback optimizer 115 distributes requirements on energy production demanded by a lower level control subsystem 195 as indicated in FIG. 1B in order to control indoor temperature.

Energy demanded by the consumer, such as a building 125, is determined from the desired building conditions 130, for example shown as a desired temperature, $T_D$ of 21° C. in a classical type of a feedback regulator. The conditions triggering a change in energy demand provided by an energy demand forecaster 135 may be indoor temperature out of specified range, too high or too low supply of domestic hot water etc. The difference between a measured value of the condition variable and its desired value is transformed to an estimated energy demand change by the demand forecaster 135, also referred to as a feedback regulator and is passed to the higher level nonlinear controller, also referred to as the feedback optimizer 115.

In one embodiment, demand forecaster 135 might be denoted also as a part of a feed forward regulator. No difference is evaluated because future indoor conditions can only be estimated using a model of building demands.

Energy demand forecaster 135 in one embodiment does not measure actual instant indoor conditions. Forecaster 135 instead estimates a profile of energy demands e.g. 24 hours ahead using weather forecast, occupancy forecast etc. According to this estimate (the forecast) an optimal schedule is computed. The schedule includes switching of devices and their operating points (set points of controllers). For a future schedule exact future indoor conditions are not known, as disturbances referred to as future actual influences on the building are not known. Therefore the schedule is only a rough energy production plan. More accurate control of indoor conditions, e.g. minute by minute, is achieved just in time by feedback control in a closed loop as depicted in FIG. 1B.

In some embodiments, the schedule represents a sequence of on-off states optimal for a certain whole future time interval given a current state of knowledge. An optimal on-off configuration regarding only the current situation may differ from a configuration regarding optimization for a longer time interval, e.g. four days ahead.

Optimizing on longer time intervals may prevent undesirably frequent changes of configuration (e.g. frequent switching of a boiler), which may shorten the lifetime of the boiler or other devices. Combining this schedule—on-off states optimal for a longer interval, with short term (on control interval) closed loop controls of set points is performed by the present system.

The nonlinear controller 115 distributes the required demand change among running devices with regard to capacities available at that time, device response times, efficiencies of the equipment and real time prices of energy purchased from external suppliers or prices contracted for energy. Real time prices are volatile, while contracted tariffs are stable. Nonlinear controller 115 may take into account actual prices, either real time or contracted, or both, whichever is appropriate. The running devices in the utility plant 120 in the example shown at 100 include a chiller 1 at 140, absorption chiller 2 at 142, boiler 1 at 144, boiler 2 at 146 and heat exchanger (hex) 148. Some utility plants may have many more devices and types of devices such as gas turbines and others in further embodiments. The example plant 120 is simplified for illustration purposes.

Each device may have an associated actually delivered power output, P, labeled in FIGS. 1A and 1B with a subscript corresponding to the type of device producing it. For instance, the chillers produce chilled water as a function of their energy consumption. The chilled water may be provided via 155 to a cooling device 160 in building 125.

Similarly, boilers provide hot water or steam produced from their energy input via 162 to a heating unit 165 in building 125. Each device may have a controller or actuator coupled to it to receive set points and control the energy input and power output in a conventional manner. The plant 120 may also be coupled to a public electricity grid at 150, gas pipeline 152, or any other external energy sources, collectively referred to as public energy resources. Surplus energy, such as electricity in some utility plants, may also be sold back to a public grid 150.

Real inter-temporal constraints between two successive device set points may not be fully considered in used models. The problem is approximately solved as a series of independent self-contained optimizations that take into account only constraints on the rate of change of set points rather than as a dynamic problem.

The controller 187 may include a lower level control subsystem 195, which may take into account heat capacity of the building, may consist of single input single output loops (PI, PID controllers), a model predictive or other type of controllers. The lower level control subsystem manages the stability of the entire control loop. Even if the balance cannot be temporarily achieved, the feedback optimizer 115 as part of controller 187 finds economical set points that drive the plant to desired balance. A temporary deficit or surplus of energy is compensated in the shortest possible time by choosing devices with the fastest response.

The parameters of a plant model 170 used by the feedback optimizer 115 include energy conversion characteristics (efficiency curves), capacity limits, and maximum rates of increase and decrease of production for each conversion device in the plant. Efficiency curves, which are characteristic for the type of device being controlled, may also be influenced by other factors, e.g. weather conditions. For example, an absorption chiller may have an efficiency and capacity that is a function of cooling media temperature, current ambient temperature and other meteorological conditions as well as maintenance conditions and age of the chiller. Still further, devices such as chillers and boilers may interact, affecting the efficiency and output of each.

In various embodiments, the nonlinear controller economically eliminates or mitigates misbalances due to fluctuating loads but also supports transitions of the system between successive scheduled steady states.

The nonlinear controller 115 may provide for economically optimal control of utility plants or microgrids of building complexes, campuses, military bases etc. in various embodiments, an elementary dispatch control interval, e.g. 15 min. is divided into finer subintervals, where the configuration of devices (unit commitment) in the plant is fixed and demand and supply are balanced in real-time in a feedback control mode.

In one embodiment, the nonlinear controller 115 may be installed on a common personal computer with several interfaces. Besides the described functionality, the nonlinear controller may implement several supportive modules with dedicated functions including but not limited to:

A public energy price module that is coupled to a network to acquire purchased energy prices as indicated at 175. Real time energy prices may include actual energy tariffs, and may be obtained from on-line sources, or may also be derived from existing contracts.

A plant monitor module coupled to sensors to receive information and monitor the status of the plant technology. A demand forecasting module 135 coupled to receive data and provide forecast of consumption profiles of each energy source supplied to a building in specified time periods and define bounds on a supply profile. Devices in the plant convert imported energy in the form of electricity, fuels, and heat into utilities demanded by the building. The integral demands for utilities is distributed/allocated among energy resources of the plant. Devices in the plant convert imported energy in the form of electricity, fuels, heat into utilities demanded by the building.

A control exporter module that exports set points for all controlled devices.

A communication module that mediates communication between the controller and the operator.

In one embodiment, the control loop contains a low level feedback regulator, which converts unsatisfied requirements on in-building conditions to requirements on energy demand changes. It may be a PI (proportional-integral), PID (proportional-integral-derivative) regulator or e.g. a linear MPC (model predictive control) controller.

Communication of the nonlinear controller with other parts of the plant control system may be realized e.g. by wireless or power line networking. The most secure is a duplicated communication channel. Communication outside may use an Internet connection to pertinent web servers; the data flows are minimal.

In one embodiment, optimizer 115 operates in a scheduling mode as shown in FIG. 1A to determine which devices should be on, and control actions 177 to specify a set point 180 for each running device from a forecast of building energy demand 135 and a forecast of factors 185 influencing the operation of the utility plant (e.g. outdoor temperature) so that the operation is economically optimal and no constraint is violated. This is done for each scheduling interval (e.g. 15' long) constituting the operation schedule for the whole scheduling time horizon (e.g. 48 hours long with 192 single 15' steps). In some embodiments, the schedule may also take into account real costs of or penalties for starting up and shutting down devices between neighboring time intervals.

FIG. 1B is a block diagram of a controlled utility plant schema generally at 186 with an optimizing controller 187 operating in a feedback mode. Reference numbers are consistent with those used in FIG. 1A. The feedback optimizer 115 operates to update current set points 190 that cover a new demand with minimum cost. The low level controller 195 is shown in FIG. 1B as providing an estimate of the change of current energy delivery to the building in next control interval that will be needed to get indoor comfort to required level (from 19° C. to 21° C.) in one example embodiment. The change of current energy deliver is referred to as $\Delta D$, which is summed with $D_F$ 197, the original energy demand determined by the feedback optimizer to provide a new energy demand $D_R$ 198 to the feedback optimizer 115. In this example, a monitored indoor condition at 199 indicates a temperature Tin of 19° C., which is two degrees cooler than the desired conditions indicated at 130. Original demand in one embodiment means the forecasted demand used as input in the first control step in the scheduling interval as recorded in the schedule. Original demand in one embodiment in the first control step of each scheduling interval means the forecasted step in the scheduling interval as recorded in the schedule. In next control steps of the scheduling interval, original demand is always equal to the previous updated demand (Current Original D=Previous Total=Previous Original D+Previous $\Delta D$).

Alternatively, the current "original" demand is always the previous updated, total, demand (Current Original D=Previous Total D=Previous Original D+Previous $\Delta D$).

In each control step (control interval), a new $D_F$ is equal to old $D_R$ plus a requested change $\Delta D$. A new $\Delta D$ is computed in each control interval. In a relaxed task, a new $D_F$ is equal to old computed additional variable $D_{Rvar}$ plus a requested change $\Delta D$.

Figure 2:
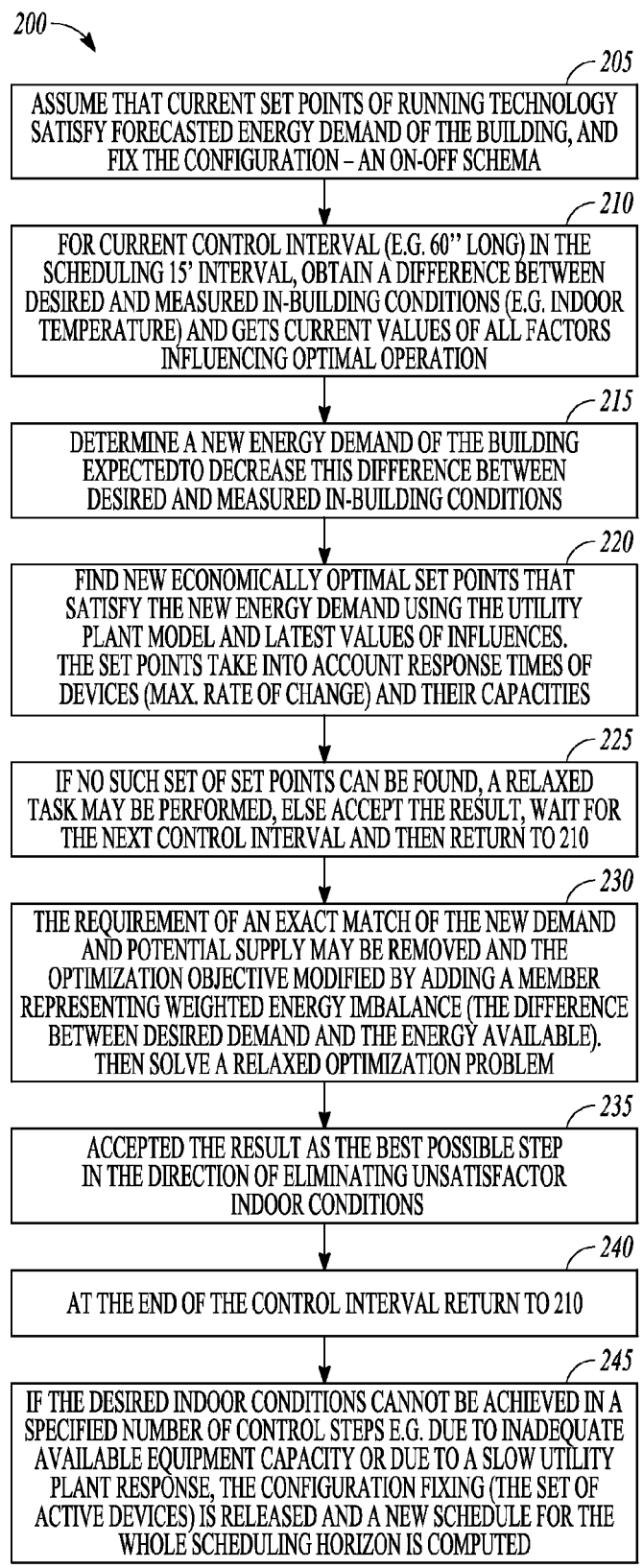
FIG. 2 is a flowchart illustrating a method implemented by the optimizer for scheduling devices in the utility plant according to an example embodiment.

FIG. 2 is a flowchart illustrating a method implemented by the optimizer 115 for scheduling devices in the utility plant. In the scheduling mode, the optimizer 115 determines which devices should be on, and a set point for each running device from a forecast of building energy demand and a forecast of factors influencing the operation of the utility plant such as outdoor temperature, so that the operation is economically optimal, forecasted demands are satisfied, and no constraint is violated. This is done for each scheduling interval for an entire scheduling time horizon, such as 48 hours.

At 205, the beginning of a scheduling interval, the optimizer 115 assumes that current set points of running technology satisfy forecasted energy demand of the building, and fixes the configuration—an On-Off schema detailing the states of each device in the plant. It is assumed that an optimal schedule has been computed with the forecasted demands before beginning at 205.

For each current control interval (e.g. 60" long) in the scheduling 15' interval method 200 obtains a difference between desired and measured in-building conditions (e.g. indoor temperature) and gets current values of all factors influencing optimal operation at 210. Note that in the scheduling mode, no measured indoor comfort value is taken into account. The optimizer 115 computes the schedule—on-off values and set points only on the basis of forecasted values in each of 15' or 60' intervals in one embodiment.

The low level controller using a suitable control algorithm may be used to determine a new energy demand at 215 of the building expected to decrease or remove this difference between desired and measured in-building conditions. At 220, the Optimizer finds new economically optimal set points 180 that satisfy the new energy demand using the utility plant model 170 and latest values of influences 185. The new set points take into account response times of devices (max. rate of change) and their capacities. In some embodiments, the control interval is long enough for the devices to be able to follow set point changes.

If no such set of set points can be found, a relaxed task, not considered in scheduling mode, may be performed as indicated at 225. Otherwise, the result is accepted, the next control interval is waited for, and then method 200 returns to 210. In the relaxed task, the requirement of an exact match of the new demand and potential supply may be removed at 230 and the optimization objective modified by adding a member representing weighted energy imbalance (the difference between desired demand and the energy available). A relaxed optimization problem is now solved. The result is accepted at 235 as the best possible step in the direction of eliminating unsatisfactory indoor conditions. At the end of the control interval as indicted at 240 method 200 returns to 210 for future use of the scheduling method when desired by the operator.

At 245, if the desired indoor conditions cannot be achieved in a specified number of control steps e.g. due to inadequate available equipment capacity or due to a slow utility plant response, the configuration fixing (the set of active devices) is released and a new schedule for the whole scheduling horizon is computed, which will likely result in a change of the number of devices operating.

Figure 3:
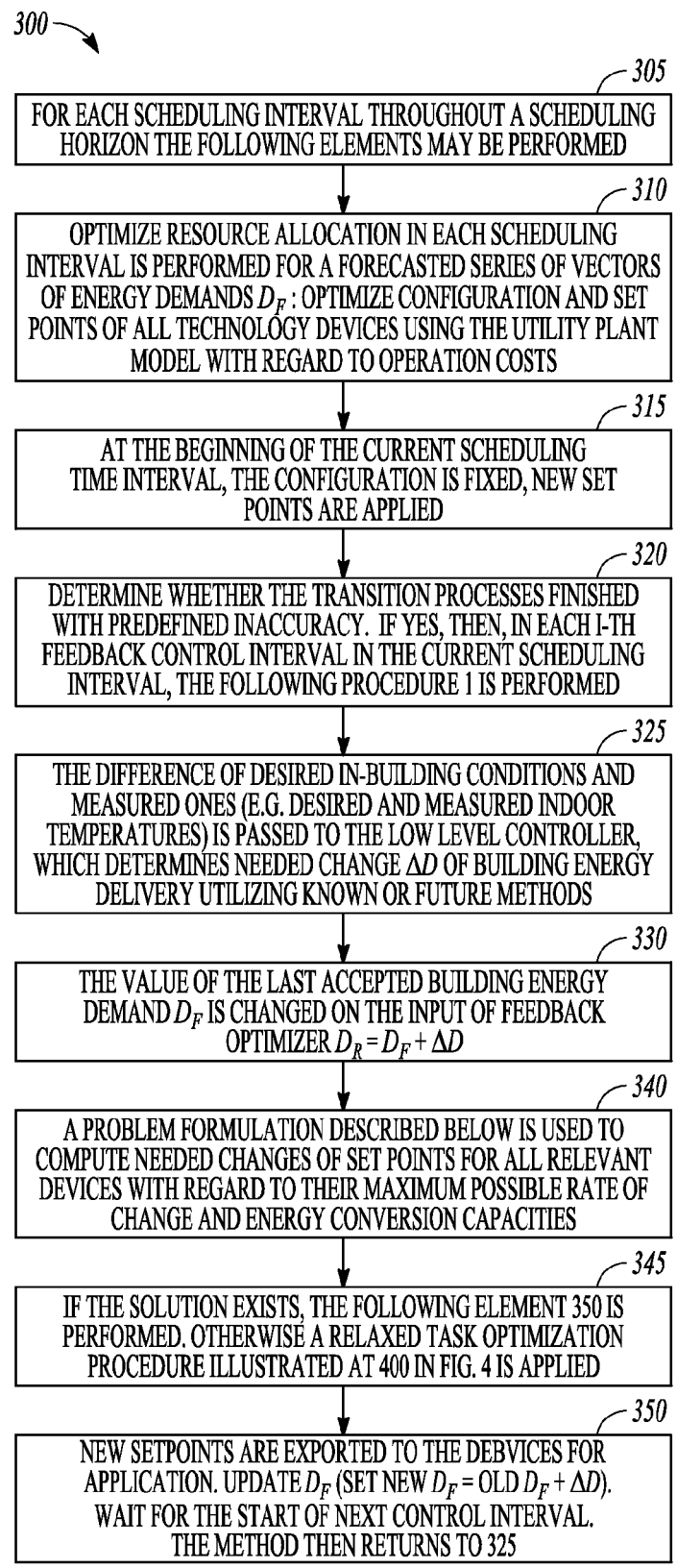
FIG. 3 is a flowchart illustrating operation of the optimizer according to an example embodiment.

FIG. 3 is a flowchart illustrating a method 300 of optimizer operations. Assuming an optimal schedule has been solved with forecasted demands, method 300 begins at 305. For each scheduling interval throughout a scheduling horizon the following elements may be performed. At 310, optimization of resource allocation in each scheduling interval is performed as part of optimization of overall scheduling steps in the scheduling horizon performed together, for a forecasted series of vectors of energy demands $D_F$: Optimize configuration and set points of all technology devices using the utility plant model with regard to operation costs.

In one embodiment, there are for example, 24 scheduling intervals in a scheduling horizon. For each of these 24 scheduling intervals demands $D_F$ are forecasted. When an optimal schedule is computed, a configuration (ON-OFF) and set points of all ON-devices are determined for each of 24 scheduling intervals in the scheduling horizon. The optimization is performed for the whole scheduling horizon at once, as solutions in individual scheduling intervals may be interrelated. When the schedule is computed, it is used in further steps.

At the beginning of the current scheduling time interval at 315, the configuration is fixed, new set points are applied. In one embodiment, the configuration is not changed in any control step of the scheduling interval unless a new schedule is recomputed. The conditions for it are stated in FIG. 3. The configuration may be changed, if entering into the next scheduling interval, where the change is determined by the schedule.

Because a new scheduling interval has been entered, a new configuration is accepted and fixed for all next control intervals in this scheduling interval. New set points defined in the schedule are also accepted and applied. A determination may be made whether these set points are satisfactory after the first control step of the scheduling step ends. Then different determined set points may be applied. The configuration was kept fixed, if not forced to change it according to the recomputed schedule.

At 320, it is determined whether the transition processes finished with predefined inaccuracy. The transition process is watched here, because a new schedule interval has been entered, and there may be a significant change in configuration as well as in set points. If the transition process finished with predefined inaccuracy, then, in each t-th feedback control interval in the current scheduling interval, the following procedure 1 is performed:

At 325, the difference of desired in-building conditions and measured ones (e.g. desired and measured indoor temperatures) is passed to the low level controller, which determines needed change $\Delta D$ of building energy delivery utilizing known or future methods. The needed change is a change of the last used $D_F$.

At 330, the value of the last accepted building energy demand, $D_F$, is changed on the input of Feedback Optimizer $D_R = D_F + \Delta D$.

At 340, a problem formulation described below is used to compute needed changes of set points for all relevant devices with regard to their maximum possible rate of change and energy conversion capacities.

Figure 4:
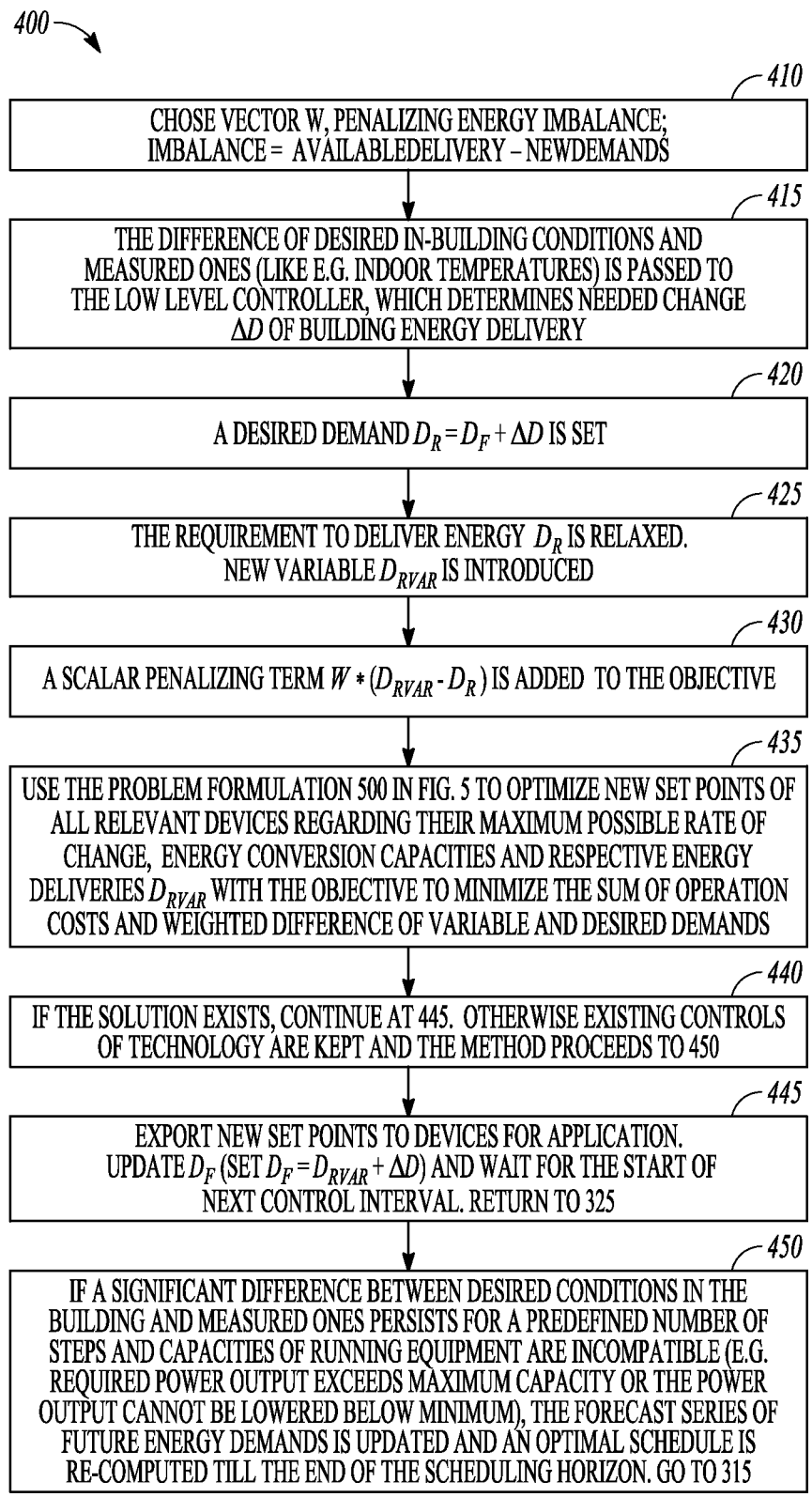
FIG. 4 is a flowchart illustrating operation of the optimizer providing a relaxed task optimization according to an example embodiment.

At 345, if the solution can be found, meaning that set points covering the required demand $D_R$ are found in the current configuration of devices, the following element 350 is performed. Otherwise a relaxed task optimization procedure illustrated in FIG. 4 is applied. At 350, new set points are exported to the devices for application DF is the updated: set DF=DF+$\Delta$D. The method then returns to 325 to wait for the start of the next control interval.

Stated another way, in one embodiment the low level controller determines new necessary demand at the beginning of the control interval and the feedback optimizer performs computation of new set points very quickly. Then we may consider application of new set points immediately, already in the same control interval and keeping them fixed till its end. Computation of new set points during the control interval and exporting the new set points for actuation in next interval is an alternative. In one example, a scheduling phase may begin at 2:00 PM where the weather forecast and imported energy prices are imported. An optimal schedule is then computed: set points and on-off for each device constant in each 15' long interval of the scheduling horizon, which is 48 hours long->a series of 48×4 scheduling intervals This schedule is valid as long as it is not recomputed.

In a feedback control phase, the example continues at 15:30 PM where a 15' long scheduling interval is divided into 15 one minute long control intervals. In each control interval of the scheduling interval indoor conditions are measured and the lower level controller determines how to change last accepted demand estimate to achieve required comfort in the building. Procedure I beginning at 310 or Procedure II at 400 is applied.

In some embodiments, unchanged energy demands and unchanged set points are obtained directly from the schedule in the first control interval of the scheduling interval (15:30-15:31). Alternatively, up to date set points are computed using energy demand updated as a sum of the energy demand in previous control interval (the last one of the previous scheduling interval) and a change determined from current indoor conditions.

In a next control one minute long intervals in (15:31-15:45), a previous demand is taken and modified according to a new change determined now by low level controlled with the aim to remove discomfort. Procedure I or Procedure II is applied.

If even Procedure II cannot remove discomfort or follow demand planned by low level controller, the scheduler is called to correct the schedule with regard to this insufficiency and the schedule is recomputed.

In a further example, the building is being preheated after a cold night and the heat delivery from the boiler plant should follow a preheating plan determined by the low level controller for current indoor temperature. But after 30 minutes it is evident that two currently available boilers, even if fully loaded, cannot reach desirable conditions in time, because morning outdoor temperature (influence) is lower than forecasted and higher heating intensity is needed. Then, a new schedule is computed with updated series of predicted demand forecasts. Now two more boilers are made available. Then the measured speed of indoor temperature increase is accepted. This decision making illustrates a solution involving the inability to achieve a balance in a predefined time FIG. 4 is a flowchart illustrating a method 400 of performing a relaxed task optimization. At 410, chose vector w, penalizing energy imbalance; Imbalance=AvailableDelivery−NewDemands. The difference of desired in-building conditions and measured ones (like e.g. indoor temperatures) is passed to the low level controller at 415, which determines needed change $\Delta D$ of building energy delivery. A required demand $D_R=D_F+\Delta D$ is set at 420. At 425, the value of building energy demand D is relaxed on the input of Feedback Optimizer and an additional variable $D_{Rvar}$ is introduced. At 430, a scalar penalizing term $w^*(D_{Rvar}-D_R)$ is added to the objective. A problem formulation described below may then be used at 435 to optimize new set points of all relevant devices regarding their maximum possible rate of change, energy conversion capacities and respective energy deliveries $D_{Rvar}$ with the objective to minimize the sum of operation costs and weighted difference of variable and desired demands.

If the solution exists as determined at 440 and a new value of $D_{R\ var}$ is determined, method 400 continues at 445 with new set points exported to devices for application. $D_F$ is then updated: Set $D_F=D_{R\ var}+\Delta D$. Method 400 then returns to 325 of Procedure I. Otherwise if the solution cannot be found, existing controls of technology are kept same as in the previous control interval and the method proceeds to 450. This is a workaround, if there is no solution. The optimizer then waits for the next interval and does nothing. This short latency is not critical. If this persists for a longer time, a new schedule has to be computed. Method 400 then returns to 315 of Procedure I. This means, that the control phase has finished, new set points are applied and the controller waits for the next control interval, where it will start with application of Procedure I again.

At 450, if a significant difference between desired conditions in the building and measured ones persists for a predefined number of steps and capacities of running equipment are incompatible (e.g. required power output exceeds maximum capacity of devices in the ON state or the power output of the plant cannot be lowered below minimum), the forecast series of future energy demands is updated and an optimal schedule is re-computed till the end of the scheduling horizon. Go to 315. In one embodiment, Procedure II remembers, how long the imbalance persist. It checks this number every time it enters 450. If the number exceeds a pre-specified value, then the mentioned condition occurs.

FIG. 5 is an illustration of a problem formulation indicated generally at 500. The problem formulation 500 includes a task objective to minimize total cost of energy from public resources, imported and exported as indicated in a formula at 510. The cost of k-th purchased energy and earnings from k-th sold energy in t-th interval is indicated at 515. An imported/exported energy in t-th interval is determined at 520 and 530. The problem formulation includes inequality constraints on capacities of public resource indicated at 525 and a function evaluating purchased energy and sold energy in t-th interval from set points of all devices at 530. The function is defined by the model with 1, 2, . . . J corresponding to indexes of all devices.

A change of building energy demand (demands are generally expressed as vectors) evaluated by the lower level controller to ensure required conditions is set forth at 535. An equality constraint—new vector $D_R$ of energy demands equals to predicted demands of the scheduling interval (in the first control interval) or to demands used in the preceeding control interval later plus the needed change is imposed at 540. Capacity inequality constraints of j-th conversion device are indicated at 545, and an inequality constraint on rate of power output change of j-th device in t-th interval is indicated at 550. $P_j$ is the power output setpoints of devices determine total consumption of k-th energy of the plant.

Variables include:
C—cost, c—purchased or sold energy prices
E—energy (el—electricity, ng—gas)
$E_k > 0$ corresponds to purchased energy
$E_k < 0$ corresponds to sold energy
P—power output set points
$\Delta P$—rate of change of power output of a device ΔT—length of the control interval
D—vector of building energy demands
Constants includes:
M$_t$—set of active devices in t-th interval
K—number of public energy sources
Indexes include:
t—index of time control intervals (t=1, 2, . . . )
k—index of public energy sources
j—index of conversion devices
p—purchase
s—sale
F—forecast
R—required In a relaxed problem formulation illustrated as equations 600 in FIG. 6, the task objective is to minimize total costs of energy from public resources as illustrated at 610. At 615, the cost of k-th energy from public resources in t-th interval is shown. At 620 an imported/exported energy in t-th interval is represented. Inequality constraints on capacity of public resources are shown at 625. A function evaluation of primary energy consumption t-th interval from set points of all devices is represented at 630. 635 represents a vector of changes of building energy demand evaluated by the lower level controller to ensure required conditions. A vector of new energy demands considered as an additional variable is shown at 640. Capacity inequality constraints of j-th conversion device are shown at 645. An inequality constraint on rate of power output change of j-th device in t-th interval is illustrated at 650.

The problem variables are Pj, which is the power output setpoints of device determine the total consumption of k-th energy of the plant. $D_{Rvar}$ is the attainable energy delivery satisfying the possible energy demands as close as possible.
Variables include:
C—cost, c—purchased or sold energy prices
E—energy (el—electricity, ng—gas)
$E_k$ >0 corresponds to purchased energy
$E_k$<0 corresponds to sold energy
P—power
ΔP—rate of change of power output of a device
ΔT—length of the control interval
D—vector of building energy demands
Constants include:
M$_t$—number of active devices in t-th interval
Indexes include:
t—index of time control intervals (t=1, 2, . . . )
k—index of public energy sources
j—index of conversion devices
p—purchase
s—sale
E—external/public energy source
F—forecast
s—sale
R—required
var—index denoting variable In various embodiments, w, may be selected to express a tradeoff between the speed of lower comfort recovery and costs. A high value of w implies preferred speed of comfort restoration, lower value of w gives preference to low costs, even if indoor conditions are not 100% satisfactory. w may be a function of discomfort w(discomfort)—high for significant discomfort and lower for lower values of discomfort.

Figure 7:
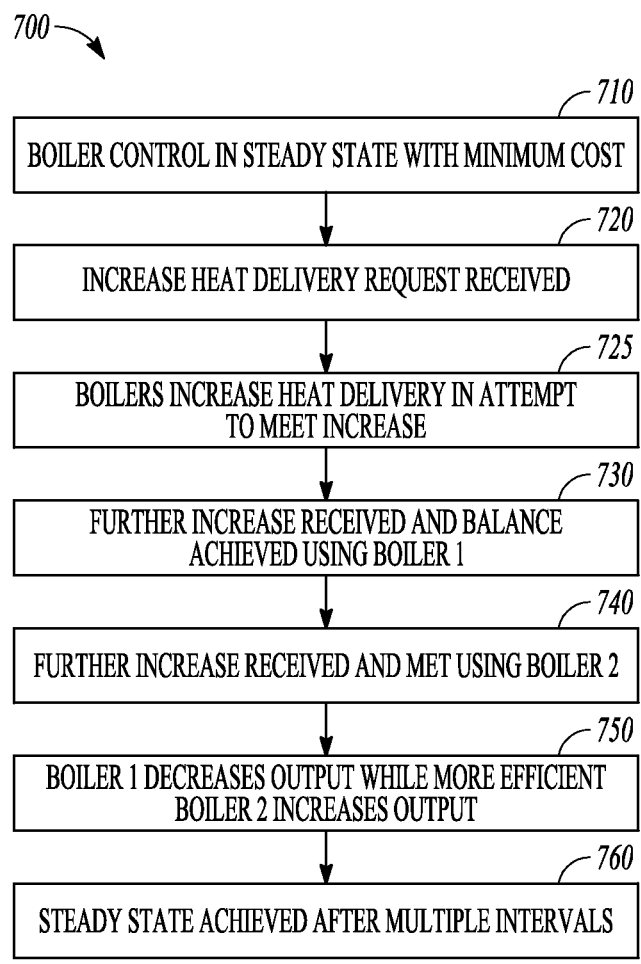
FIG. 7 is a flowchart illustrating an example optimizer operation while responding to a transient change in demand according to an example embodiment.
Figure 9:
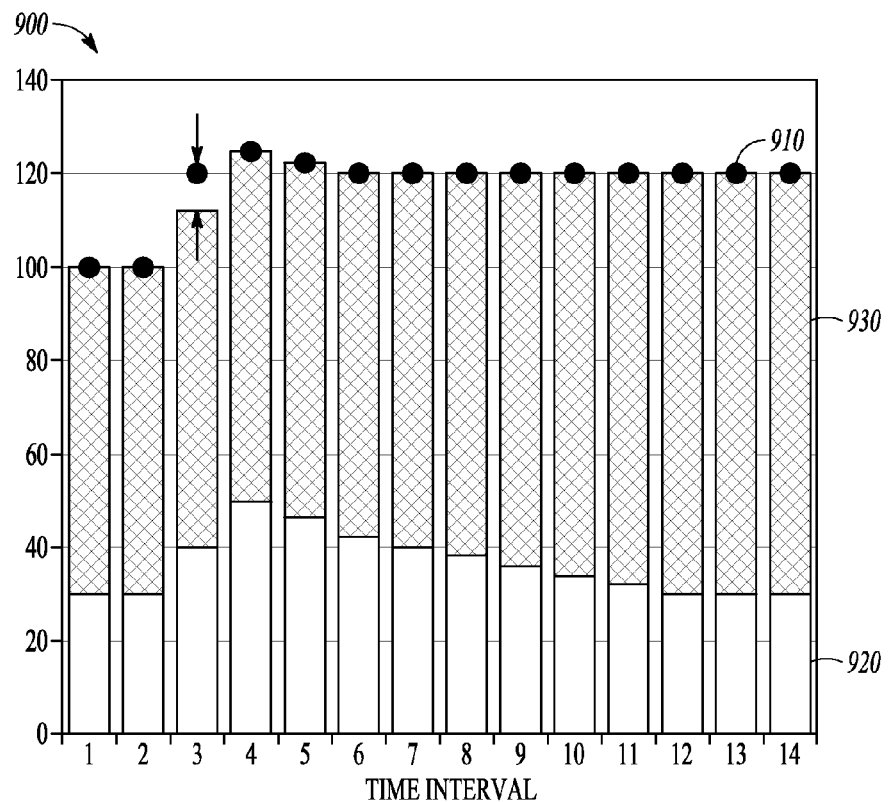
FIG. 9 is a bar chart representation of heat output of boilers according to the example of FIG. 7.
Figure 10:
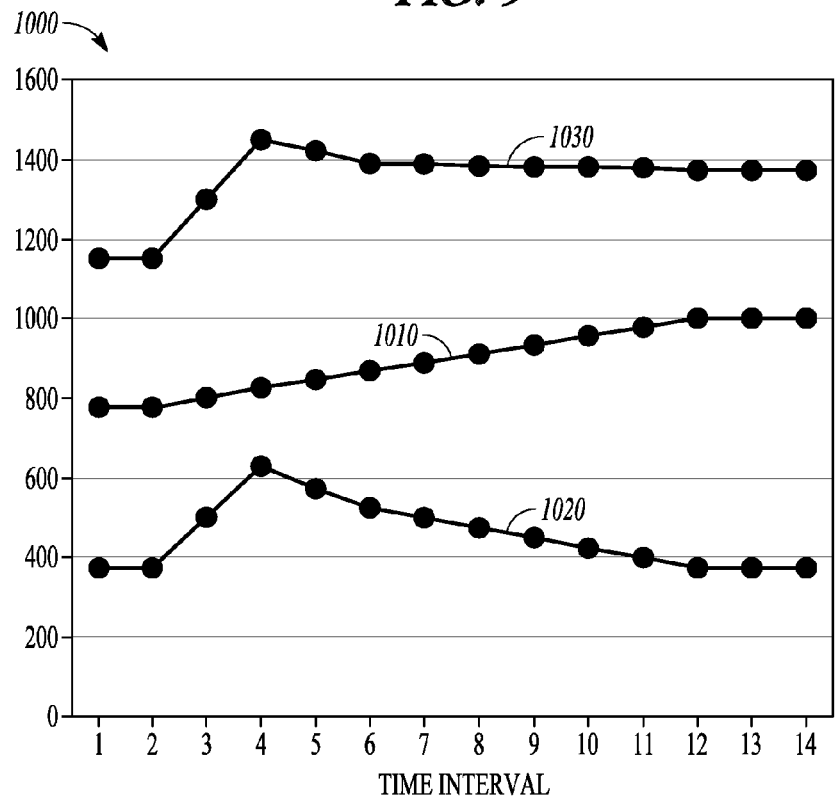
FIG. 10 is a graph illustrating fuel costs of boiler operation in accordance with the example of FIG. 7.

FIG. 7 is a flowchart illustrating a simplified example method 700 of optimizer operation while responding to a transient change in demand according to an example embodiment. In the example, time denotes time at the end of a control interval. The example is also illustrated using a chart 800 in FIG. 8, and graphs 900 and 1000 in FIGS. 9 and 10 respectively. FIG. 8 is a chart 800 illustrating demand and boiler output with operating costs in accordance with the example of FIG. 7. FIG. 9 is a bar chart graphical representation of heat output of boilers according to the example of FIG. 7. FIG. 10 is a graph illustrating fuel costs of boiler operation in accordance with the example of FIG. 7.

The simplified example utilizes the boilers 144 and 146 from FIG. 1B, referred to as boiler 1 and boiler 2 in this example, to provide hot water to heating unit 165, ignoring the chillers. Boiler 1 has an efficiency of 0.8 and a maximum rate of output change of 10 kW/t.i. (time interval), and boiler 2 has an efficiency of 0.9 and a maximum rate of output change of 2 kW/ti. In other words, boiler 1 can change output faster than boiler 2, but is less efficient.

Chart 800 includes columns showing the control interval 810, required demand increase 812, total demand 814, boiler 1 output 816, boiler 2 output 818, and operation costs 820. The total delivered energy during a time interval is the sum of the corresponding values provided by the boilers in 814 and 816. The chart shows how the total demand 814 is not met at T3, met after the transient at T6, and then cost optimized by T12. The cost increases when the fast changing boiler 1 is utilized during the transient to attempt to meet the demand, and then how after T4, more efficient boiler 2 gradually increases output while boiler 1 decreases output, coincident with decreasing operation costs.

Method 700 consists of several stages in this example. T1 and T2 are an initial steady state with total demand, $D_R$, equaling total delivery of 100 as indicated at 710. At T3, corresponding to 720, desired indoor temperature is increased by building occupants and the low level controller indicates increased heat demand to achieve it. Boilers at 725 start to increase their outputs to 112, but cannot satisfy energy delivery requested, $D_R$=120, by the low level controller.

At 730, corresponding to T4, the low level controller in this example still increases energy demanded from boilers ($D_R$=125). Imbalance of energy supplied by boilers and demand indicated by the low level controller lasts into the next interval. The system nearly achieves the balance at the end of the 4$^{th}$ interval mainly with faster, but not as efficient boiler 1.

At 740, T5, the boilers satisfy the demand requested by the low level controller, which, due to properties of the low level controller in this example, is still higher ($D_R$=121) than needed for attaining desired indoor temperature in the building.

T6-T11: LLC stabilizes its request on the value that is sufficient for keeping desired indoor temperature ($D_R$=120). From now on, the low level controller requests constant energy delivery, but boilers operation is not steady due to the process that minimizes the costs as indicated at 750. Balance is kept, and inefficient boiler 1 may decrease its output.

At 760, T12, a steady state is achieved. Optimum operation of boilers is achieved. Their operation is stabilized, and the low level controller requested demand is steady. The whole process 700 has ended.

In this example, the transient of low level controller actions lasts from T3 till T5. The transient of boilers lasts from T3 till T11. In one embodiment, the required total demand at an interval t, in column 814 is equal to the delivered sum from columns 816 and 818 for the previous interval (t−1) plus the increase in the current interval (t) indicated in column 812.

The heat output of the boilers is illustrated graphically in FIG. 9 at 900, with the total demand indicated by dots 910, boiler 1 output show in bar chart form at 920 along with boiler 2 output at 930. Fuel costs for each of the boilers is broken out in a graph at 1000 in FIG. 10. Boiler 2 cost is shown at 1010, boiler 1 cost at 1020, and total cost at 1030.

The example shows the situation when boilers are not fast enough and cannot balance increased heat demand requested by the low level controller in time. A temporary imbalance appears during a transient, which is removed after several time intervals when balance is restored again. During the transient, a penalty occurs by using a relaxed problem due to the difference between demand and supply being high. The penalty occurs because a shorter transient time is preferred to satisfy the demand at the sacrifice of efficiency and minimum cost. By the end of the transient, optimum efficiency is again achieved.

Method 700 has been controlling the boilers up until time T3, as indicated at 710 where the boilers have been operating since T1 at optimal heat outputs with minimum costs. At the beginning of the third time interval as indicated at 720, the low level controller indicates an increase of heat delivery of 20 kW. Both boilers are provided higher set points to start to increase their output with a maximum rate of change at 725. Boiler 1 increases by 10 kW/ti and boiler 2 by 2 kW/ti total.

At interval T4, the heat delivery is less than the requested increase and insufficient to balance the demand. The low level controller in this example, increases the demand by 13 kW at the beginning of the interval as indicated at 730. Different method of determining required demand may be used by different low level controllers. Boiler 1 nearly achieves the balance at the end of the $4^{th}$ interval.

At the beginning of interval T5, the low level controller decreases the demand as indicated at 740, by 3 kW. The boilers are able to achieve the balance. Prior to time interval T6 as indicated at 750 boiler 2 keeps its output increasing, as its higher efficiency allows a decrease in operating costs. Boiler 1 with lower efficiency only ensures the balance and thus it decreases its output appropriately as also indicated at 750. At the end of interval T12, indicated at 760, the steady state is achieved. Heat outputs of both boilers are settled again at cost optimal values yet with increased heat production.

While the simple example only illustrated an increase in heat demand, decreases in heat demand may also be processed similarly, with the faster reacting boiler operating with larger changes to meet the demand, followed by optimization. The weighting of the difference between may be selected by an operator to affect how quickly the utility plant reacts to transitions. If comfort is the highest desire of the operator, the difference may be weighted heavily, causing the difference to be minimized as fast as possible, followed by cost optimization. If cost is more important, the difference may be weighted lower, causing minimization of the different to proceed in a more cost effective manner, at perhaps the sacrifice of comfort.

In a summary, the example shows the situation, when boilers are not fast enough to immediately balance increased heat demand requested by the low level controller (in time intervals 3 and 4) within one control interval.

A temporary imbalance appears; which is removed after several time steps, when the balance is restored again. Inefficient, yet fast boiler1 plays the main role in restoring the supply-demand balance in three steps. After the primary goal of restoring the balance, the boilers' outputs are adjusted to minimize costs of delivering required output.

During the transient, a penalty w may be used for the difference between demand and supply to balance comfort versus cost. w is high in this example, which means that a shortest transient time is preferred over minimizing cost. A lower value of W would result in minimization of cost, resulting in a longer time to achieve energy demands designed to obtain a desired comfortable temperature.

Figure 11:
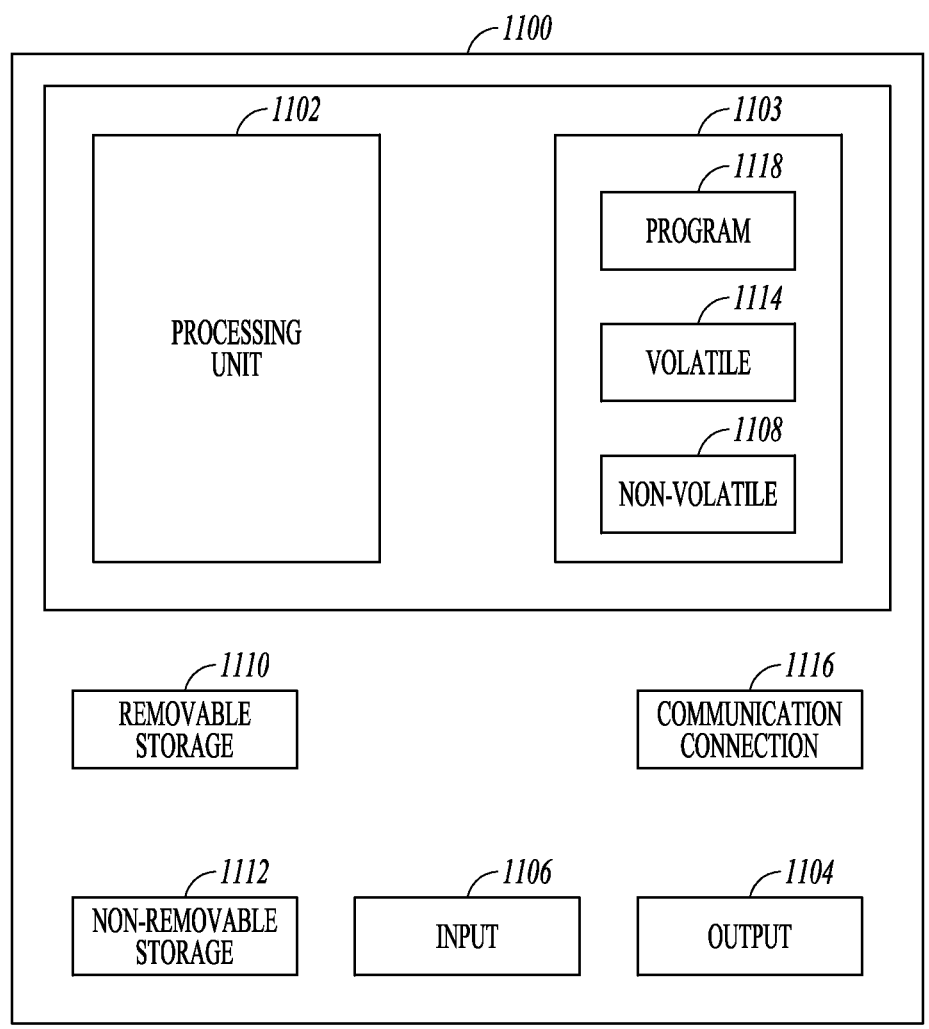
FIG. 11 is a block diagram of a computer system for implementing the optimizing controller and methods according to example embodiments.

FIG. 11 is a block schematic diagram of a computer system 1100 to implement a controller according to an example embodiment. In one embodiment, multiple such computer systems are utilized in a distributed network to implement multiple components in a transaction based environment. An object-oriented, service-oriented, or other architecture may be used to implement such functions and communicate between the multiple systems and components. One example computing device in the form of a computer 1100, may include a processing unit 1102, memory 1103, removable storage 1110, and non-removable storage 1112. Memory 1103 may include volatile memory 1114 and non-volatile memory 1108. Computer 1100 may include—or have access to a computing environment that includes—a variety of computer-readable media, such as volatile memory 1114 and non-volatile memory 1108, removable storage 1110 and non-removable storage 1112. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 1100 may include or have access to a computing environment that includes input 1106, output 1104, and a communication connection 1116. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 1102 of the computer 1100. A hard drive, CD-ROM, and RAM are some examples of articles including a non-transitory computer-readable medium. For example, a computer program 1118 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 1100 to provide generic access controls in a COM based computer network system having multiple users and servers.

Figure 12:
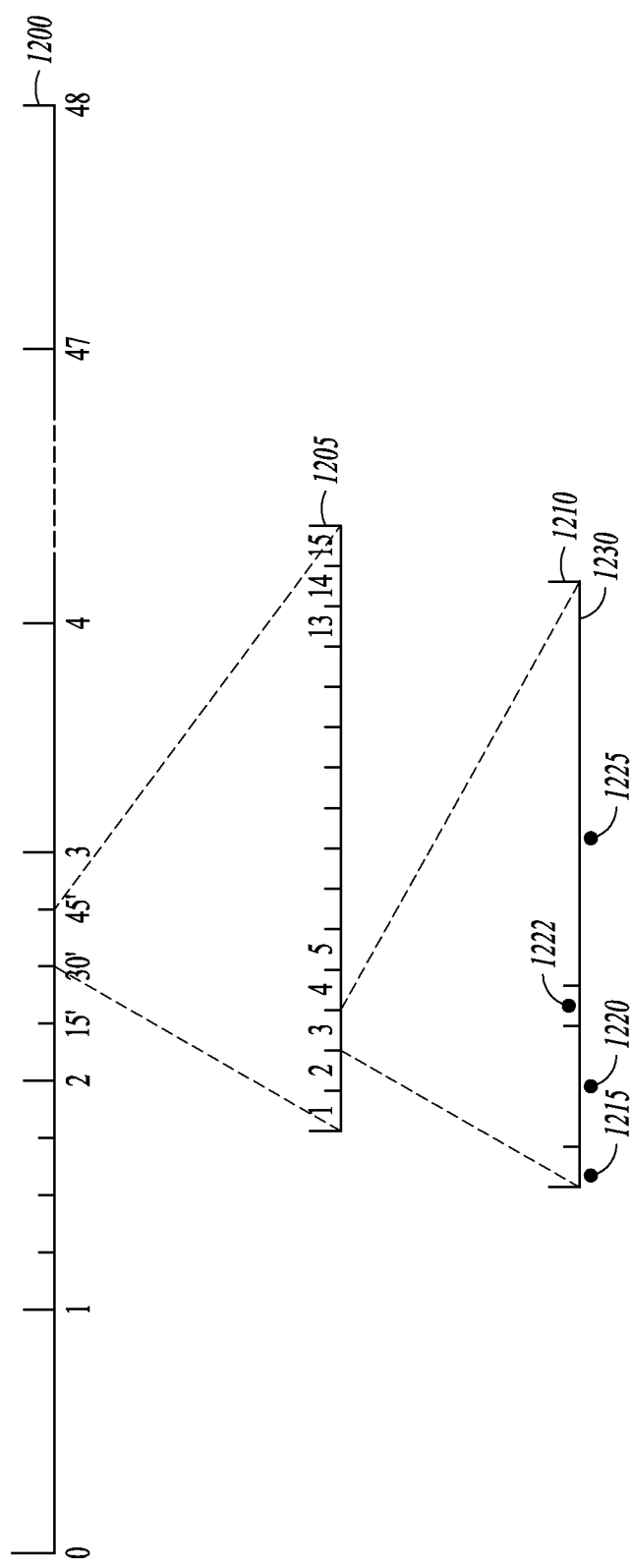
FIG. 12 is an example timing diagram showing a scheduling horizon divided into scheduling intervals and control interval, and actions occurring in a control interval according to an example embodiment.

FIG. 12 is an example timing diagram showing a 48 hour scheduling horizon at 1200, division of the horizon into 15 minutes long scheduling intervals 1205, each divided into 1 minute long control intervals 1205, and actions occurring in a control interval at 1210. In one embodiment, the actions include evaluation of measured and desired conditions at 1215, solution of problems using Procedures I and II at 1220, application of new set points at 1222, devices controlled according to new set points at 1225, and expected operation achieved at 1230. The actual times corresponding to the horizon, scheduling intervals and control intervals may be varied in further embodiments.

EXAMPLES

1. A method of controlling a utility plant having multiple devices which consume power and provide energy, the method comprising:
receiving a forecast of building energy demand;
receiving a forecast of factors influencing the operation of the utility plant;
operating an optimizer in a scheduling mode to determine which devices should be on and to provide control actions to specify a set point for each running device so that the operation is economically optimal and no constraint is violated; and operating the optimizer in a control mode to distribute energy demand between the devices based on efficiency and response times of the devices to minimize purchased energy cost.

2. The method of example 1 wherein the method is performed for each of multiple scheduling intervals constituting an operation schedule for a scheduling time horizon.

3. The method of example 2 wherein device set points are determined to minimize cost (C) in accordance with $$\sum_{k=0}^{K} C_k(t) \rightarrow \min,$$

where k is the index of purchased and sold energy in the a t-th control interval.

4. The method of any of examples 2-3 wherein the multiple factors that influence operation of the utility plant include weather conditions, building temperature set point and building occupancy.

5. A computer implemented method of optimizing a utility plant having multiple devices to convert input energy into output energy for a building, the method comprising:
dividing a utility plant scheduling interval into several control intervals and for each control interval:
obtain a difference between a desired and a measured in-building condition controlled by output power from the utility plant;
obtain current values of multiple factors that influence operation of the utility plant;
determine a new power demand of the building expected to decrease the difference; and
find set points for the multiple devices that satisfy the new power demand, take into account response times of the devices and their capacities, and optimize utility plant operation costs.

6. The computer implemented method of example 5 and further comprising for each control interval where no such set of set points is found: remove an exact match requirement for meeting the new output power demand; modify an optimization objective by adding a member representing weighted energy imbalance which is a difference between the desired demand and the energy available; and
accept the result as the best possible step in the direction of eliminating the difference between the desired and measured in-building condition.

7. The computer implemented method of any of examples 5-6 wherein the set points for the multiple devices are selected as a function of cost.

8. The computer implemented method of any of examples 5-7 wherein the set points for the multiple devices are set to minimize the difference between a desired and a measured in-building condition and modified to optimize cost in later intervals.

9. The computer implemented method of example 8 wherein the difference is minimized as a function of weighted difference between the desired and measured in-building condition.

10. The computer implemented method of any of examples 8-9 wherein the set points are changed on devices having faster response times to minimize the difference.

11. The method of any of examples 8-10 wherein device set points are determined to minimize cost of energy from public resources (C) in accordance with $$\sum_{k=0}^{K} C_k(t) \rightarrow \min,$$

where k is the index of purchased energy less earning from sold energy in the a t-th control interval.

12. The computer implemented method of any of examples 8-11 wherein set points for more efficient devices are changed to optimize the cost in the later intervals.

13. The computer implemented method of any of examples 5-12 wherein the multiple factors that influence operation of the utility plant include ambient temperature.

14. The computer implemented method of any of examples 5-13 wherein the multiple factors that influence operation of the utility plant include purchased energy cost.

15. The computer implemented method of any of examples 5-14 wherein the control intervals are treated by the method as a series of independent self-contained optimizations.

16. The computer implemented method of any of examples 5-15 and further comprising:
determining if the desired indoor air conditions cannot be achieved in a specified number of intervals; and
changing a configuration of devices operating in the utility plant by:
receiving a forecast of building energy demand;
receiving a forecast of factors influencing the operation of the utility plant; and
operating the optimizer in a scheduling mode to determine which devices should be on and to provide control actions to specify a set point for each running device so that the operation is economically optimal and no constraint is violated as a function of energy cost.

17. A device comprising:
a processor;
input connections to receive energy demand, real time energy price data, and influencing condition information; and
a memory device coupled to the processor and having a program stored thereon for execution by the processor to perform utility plant optimization by dividing a utility plant scheduling interval into several control intervals and for each control interval:
obtaining a difference between a desired and a measured in-building condition controlled by output power from the utility plant;
obtaining current values of multiple factors that influence operation of the utility plant;
determining a new power demand of the building expected to decrease the difference; and finding set points for the multiple devices that satisfy the new power demand and take into account response times of the devices and their capacities.

18. The device of example 17 and further comprising for each control interval where no such set of set points is found, optimization further comprises:
removing an exact match requirement for meeting the new output power demand; modifying an optimization objective by adding a member representing weighted energy imbalance which is a difference between the desired demand and the energy available; and
accepting the result as the best possible step in the direction of eliminating the difference between the desired and measured in-building condition.

19. The device of any of examples 17-18 wherein the set points for the multiple devices are set to minimize the difference between a desired and a measured in-building condition and modified to optimize cost in later intervals.

20. The device of any of examples 17-19 wherein optimization further comprises:
determining if the desired indoor air conditions cannot be achieved in a specified number of intervals with a current configuration of multiple devices; and
changing the configuration of multiple devices operating in the utility plant by:
    receiving a forecast of building energy demand;
    receiving a forecast of factors influencing the operation of the utility plant; and
    operating the optimizer in a scheduling mode to determine which devices should be in the changed configuration of device and to provide control actions to specify a set point for each such device so that the operation is economically optimal and no constraint is violated.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method of controlling a utility plant having multiple devices which consume power and provide energy, the method comprising:
    receiving a forecast of building energy demand;
    receiving a forecast of factors influencing the operation of the utility plant;
    operating an optimizer in a scheduling mode to determine which devices should be on and to provide control actions to specify a set point for each running device so that the operation is economically optimal and no constraint is violated;
    operating the optimizer such that the optimizer takes into account a cost or penalty for starting up and shutting down the multiple devices between neighboring time intervals; and
    operating the optimizer in a control mode to distribute energy demand between the devices based on efficiency and response times of the devices to minimize purchased energy cost;
    wherein the method is performed for each of multiple scheduling intervals constituting an operation schedule for a scheduling time horizon; and
    wherein device set points are determined to minimize cost (C) in accordance with $$\sum_{k=0}^{K} C_k(t) \rightarrow \min,$$

where k is the index of purchased and sold energy in the a t-th control interval.

2. The method of claim 1 wherein the multiple factors that influence operation of the utility plant include weather conditions, building temperature set point and building occupancy.

3. A computer implemented method of optimizing a utility plant having multiple devices to convert input energy into output energy for a building, the method comprising:
    dividing a utility plant scheduling interval into several control intervals and for each control interval:
    obtain a difference between a desired and a measured in-building condition controlled by a device from the utility plant;
    obtain current values of multiple factors that influence operation of the utility plant;
    determine a power demand of the building expected to decrease the difference;
    find set points for the multiple devices that satisfy the power demand, take into account response times of the devices and their capacities, and optimize utility plant operation costs; and
    for each control interval where no such set points are found:
    remove an exact match requirement for meeting the power demand;
    modify an optimization objective by adding a member representing weighted energy imbalance which is a difference between a desired demand and the energy available; and
    accept the result as the best possible step in the direction of eliminating the difference between the desired and measured in-building condition; determining if the desired indoor air conditions cannot be achieved in a specified number of intervals; and changing a configuration of devices operating in the utility plant by:
    receiving a forecast of building energy demand;
    receiving a forecast of factors influencing the operation of the utility plant; and operating the optimizer in a scheduling mode to determine which devices should be on and to provide control actions to specify a set point for each running device so that the operation is economically optimal and no constraint is violated as a function of energy cost.

4. The computer implemented method of claim 3 wherein the set points for the multiple devices are selected as a function of cost.

5. The computer implemented method of claim 3 wherein the set points for the multiple devices are set to minimize the difference between a desired and a measured in-building condition and modified to optimize cost in later intervals.

6. The computer implemented method of claim 5 wherein the difference is minimized as a function of weighted difference between the desired and measured in-building condition.

7. The computer implemented method of claim 5 wherein the set points are changed on devices having faster response times to minimize the difference.

8. The computer implemented method of claim 5 wherein set points for more efficient devices are changed to optimize the cost in the later intervals.

9. The method of claim 3 wherein device set points are determined to minimize cost of energy from public resources (C) in accordance with $$\sum_{k=0}^{K} C_k(t) \rightarrow \min,$$

where k is the index of purchased energy less earning from sold energy in the a t-th control interval.

10. The computer implemented method of claim 3 wherein the multiple factors that influence operation of the utility plant include ambient temperature.

11. The computer implemented method of claim 3 wherein the multiple factors that influence operation of the utility plant include purchased energy cost.

12. The computer implemented method of claim 3 wherein the control intervals are treated by the method as a series of independent self-contained optimizations.

13. A device comprising:
a processor;
input connections to receive energy demand, real time energy price data, and influencing condition information; and
a memory device coupled to the processor and having a program stored thereon for execution by the processor to perform utility plant optimization by dividing a utility plant scheduling interval into several control intervals and for each control interval:
obtaining a difference between a desired and a measured in-building condition controlled by a device from the utility plant;
obtaining current values of multiple factors that influence operation of the utility plant;
determining a power demand of the building expected to decrease the difference;
finding set points for the multiple devices that satisfy the new power demand and take into account response times of the devices and their capacities; and
for each control interval where no such set points are found, optimization further comprises:
removing an exact match requirement for meeting the new output power demand;
modifying an optimization objective by adding a member representing weighted energy imbalance which is a difference between a desired demand and the energy available; and
accepting the result as the best possible step in the direction of eliminating the difference between the desired and measured in-building condition; determining if the desired indoor air conditions cannot be achieved in a specified number of intervals with a current configuration of multiple devices; and changing the configuration of multiple devices operating in the utility plant by: receiving a forecast of building energy demand;
receiving a forecast of factors influencing the operation of the utility plant; and operating the optimizer in a scheduling mode to determine which devices should be in the changed configuration of device and to provide control actions to specify a set point for each such device so that the operation is economically optimal and no constraint is violated.

14. The device of claim 13 wherein the set points for the multiple devices are set to minimize the difference between a desired and a measured in-building condition and modified to optimize cost in later intervals.

* * * * *